United States Patent
Eschbach et al.

(10) Patent No.: US 7,649,649 B2
(45) Date of Patent: Jan. 19, 2010

(54) DETERMINING THE COLOR MATCH BETWEEN IMAGE DATA AND GRAPHICS OBJECTS

(75) Inventors: Reiner Eschbach, Webster, NY (US); Zhigang Fan, Webster, NY (US); David E. Rumph, Pasadena, CA (US)

(73) Assignee: Xerox Corporation, Norwalk, CT (US)

( * ) Notice: Subject to any disclaimer, the term of this patent is extended or adjusted under 35 U.S.C. 154(b) by 564 days.

(21) Appl. No.: 11/282,850

(22) Filed: Nov. 17, 2005

(65) Prior Publication Data

US 2007/0109569 A1 May 17, 2007

(51) Int. Cl.
- *G06F 15/00* (2006.01)
- *H04N 1/405* (2006.01)
- *G06T 5/00* (2006.01)
- *G06K 9/00* (2006.01)

(52) U.S. Cl. .................. 358/1.9; 358/3.15; 358/3.24; 358/3.27; 358/518; 382/167; 382/263

(58) Field of Classification Search .................. 358/1.9, 358/3.15, 3.24, 3.27, 518; 382/263–270, 382/167

See application file for complete search history.

(56) References Cited

U.S. PATENT DOCUMENTS

| | | | | |
|---|---|---|---|---|
| 6,608,942 | B1 * | 8/2003 | Le | 382/279 |
| 6,625,326 | B1 * | 9/2003 | Cho | 382/266 |
| 6,744,532 | B1 * | 6/2004 | Chen | 358/1.9 |
| 6,901,170 | B1 * | 5/2005 | Terada et al. | 382/260 |
| 7,079,281 | B1 * | 7/2006 | Ng et al. | 358/1.9 |
| 7,406,208 | B2 * | 7/2008 | Chiang | 382/266 |
| 2002/0047848 | A1 | 4/2002 | Odagiri et al. | |
| 2003/0067983 | A1 * | 4/2003 | Lee et al. | 375/240.08 |
| 2004/0239965 | A1 | 12/2004 | Krueger et al. | |
| 2005/0134886 | A1 | 6/2005 | Farrell et al. | |

FOREIGN PATENT DOCUMENTS

EP 1 006 711 6/2000

OTHER PUBLICATIONS

European Search Report for EP Application No. EP 06 12 3906, Jun. 3, 2007.

* cited by examiner

*Primary Examiner*—King Y Poon
*Assistant Examiner*—Javier Segura
(74) *Attorney, Agent, or Firm*—Fay Sharpe LLP

(57) ABSTRACT

A system/method of color match assessment for electronic documents includes receiving digital data defining a composite electronic document including a raster image object having an edge and a color graphics object bordering the edge of the raster image object. The pixel color values defining the edge of the raster image object are processed to estimate a local color variance of the pixel color values. The local color variance is used to determine if the edge can be color matched to the bordering color graphics object. If the edge can be color matched, a match color for the edge is derived. The match color is associated with the digital data defining the electronic document so that a downstream object color match system can use the match color as needed, e.g., to adjust the color of the bordering color graphics object to ensure a match with the edge of the raster image object when the electronic document is printed using a xerographic printing process.

9 Claims, 7 Drawing Sheets

DETERMINING THE COLOR MATCH BETWEEN IMAGE DATA AND GRAPHICS OBJECTS

CROSS-REFERENCE TO RELATED APPLICATION

This application is related to co-pending application Ser. No. 11/178,129 filed Jul. 8, 2005 in the name of Rich et al. and entitled "Method for Prepress-Time Color Match Verification and Correction" and the disclosure of this application Ser. No. 11/178,129 is hereby expressly incorporated by reference into this specification.

BACKGROUND

Most electronic documents, i.e., digital images, to be printed or output on a particular device include multiple objects, such as text, photos, graphics and the like. Many electronic documents are a composite of other smaller documents and objects. For example, photographic objects might be pasted into a largely text document at different locations. Color graphic objects and monochrome image objects might occur on the same page. Individual objects of an electronic document that are intended to match in color may be represented in a variety of color spaces, a situation which might arise because those elements are derived from prior documents of differing origins. This situation will not be immediately apparent to the user, because the colors of the objects appear to match on the visual display. The color mismatch is typically only detectable when the electronic document is printed using a digital printing apparatus such as xerographic printing.

One problem arises when sophisticated color transformation is involved, such that different color definitions for the same color take different color transformation paths. For example, if one object's color is specified in sRGB, and another object's color specified in SWOP (Specifications for Web Offset Publications) CMYK, the color processing needed to produce the device CMYK for the specific marking process may produce a different device CMYK value for the two objects. This might be due to differing black generation/black preservation strategies, even if the two objects would have matched exactly on a SWOP press (where no conversion of the SWOP CMYK would have been necessary). Another problem arises when more sophisticated color transformation is involved, such that non-color differences in the source (e.g., differing object type) cause the objects to take different color transformation paths. One instance of this is the Xerox Corporation DocuSP color DFE (digital front end) that can assign different ICC rendering intents to different object types having the same nominal color. For example, by default text might be assigned a "Saturation" rendering intent, while graphics might be assigned a "Relative Colorimetric" rendering intent. Especially for colors near the edge or outside the printer's color gamut, the processing of the source color may produce visibly different results.

Application Ser. No. 11/178,129 discloses a system for color match verification and correction that solves many color mismatch problems in order to create printed output documents having color matched objects as intended by the original image data, even though different color definitions are used for the same color objects in the image data.

A difficult color match problem occurs when a raster image object (e.g., a bitmap or a bytemap or the like), such as a digital photograph, a scanned image or a computer-generated image, is bordered, surrounded or touched by a solid color graphics object that might be intended to match the color along an edge of the raster image object or that might be intentionally mismatched with the color along an edge of the raster image object to provide a contrasting border. This problem is complicated by the fact that the raster image object might have a color variance along its edge(s) that border(s) the color graphics object. The present application is intended to provide input to the method/apparatus of Ser. No. 11/178, 129 to allow for color match between a raster object and a color graphics object, if color match was originally intended.

SUMMARY

A method of color match assessment for electronic documents includes: (a) receiving digital data defining a composite electronic document including a raster image object having an edge and a color graphics object bordering the edge of the raster image object; (b) processing pixel color values defining the edge of the raster image object to estimate a local color variance of the pixel color values defining the edge; (c) using the local color variance to determine if the edge can be color matched; (d) if the edge can be color matched, deriving a match color for the edge.

In a xerographic printing apparatus, a method for color match assessment for electronic documents includes: receiving digital data defining a composite electronic document including a raster image object having an edge and a color graphics object bordering the edge of the raster image object; determining if the edge and the color graphic object can potentially match in color; if the edge and said color graphic object can potentially match in color, determining a match color for the edge; saving the edge match color for use by a downstream object color match system to prevent the edge and the color graphics object from being printed in non-matching colors.

An apparatus for color match assessment for electronic documents includes: means for input of digital data defining a composite electronic document including a raster image object having an edge and a color graphics object bordering the edge of the raster image object; means for processing pixel color values defining the edge of the raster image object to estimate a local color variance of the pixel color values defining the edge; means for using the local color variance to determine if the edge can be color matched; means for deriving a match color for the edge.

BRIEF DESCRIPTION OF THE DRAWINGS

The development comprises various steps and/or components and/or arrangements of same, embodiments of which are illustrated in the accompanying drawings that form a part hereof, wherein.

DETAILED DESCRIPTION

Figure 1:
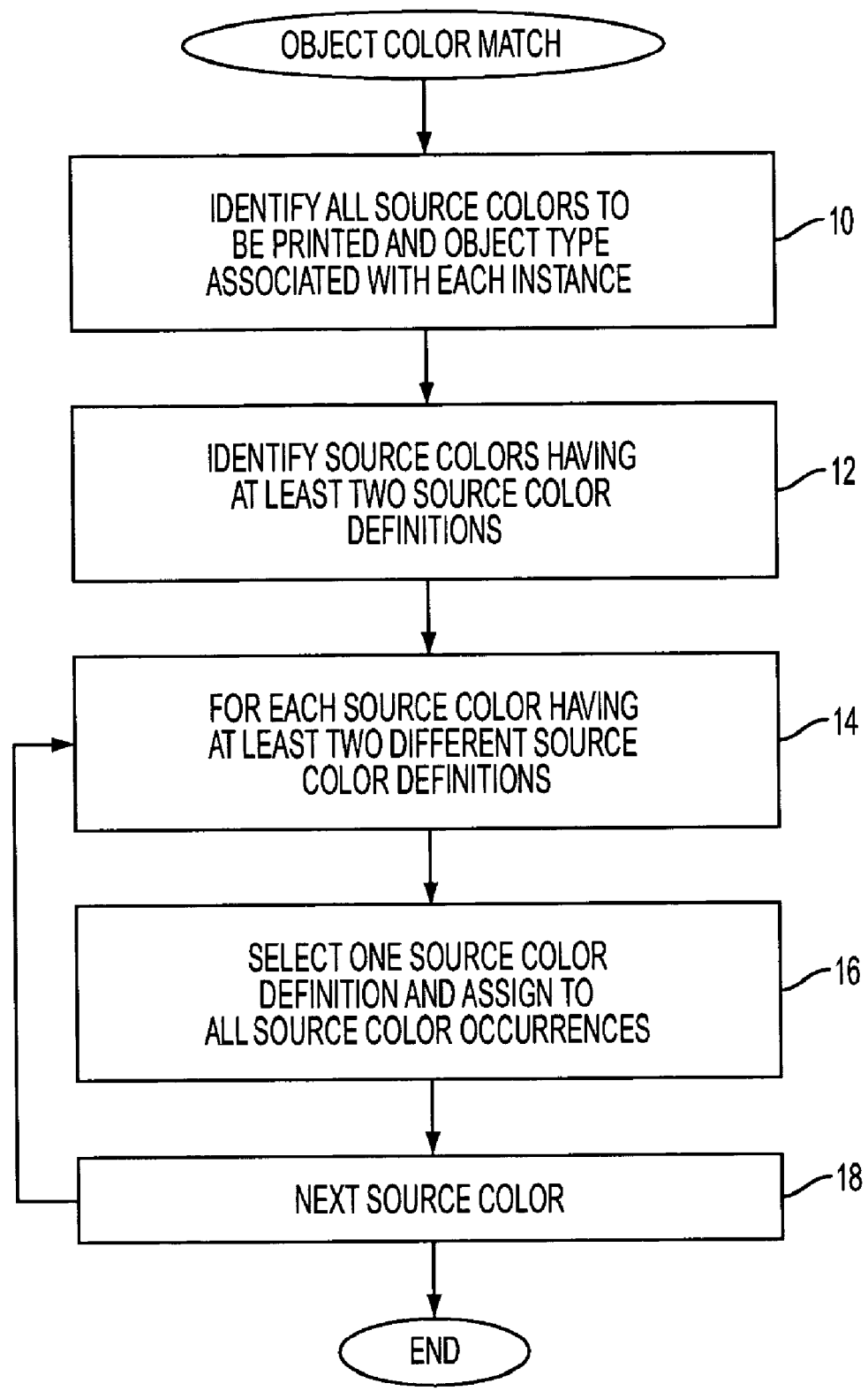
FIG. 1 is a flow chart that discloses a simplified overview of the system/method of the application Ser. No. 11/178,129, and that is suitable for receiving input from the present system/method to facilitate color match for electronic documents including raster objects and color graphics objects.

FIG. 1 is a simplified illustration of an object color match system/method as disclosed in the aforementioned U.S. application Ser. No. 11/178,129. An electronic document (digital image file) to be printed includes multiple objects such as text objects, photographic objects, graphics objects, etc., as is well known in the art. Some objects that are intended to match in color when printed, are assigned the same "source" color but, due to their differing object types, are assigned different definitions for the source color so that, when printed using a xerographic process, as opposed to using a SWOP process, they look different. This result is obviously undesired. To prevent this undesired result, a step 10 processes the electronic document data to identify all source colors in the document and the object type associated with each instance of a source color. In a step 12, all source colors that have at least two different source color definitions are identified. According to step 14, each source color having different definitions is processed so that, in a step 16, one source color definition is selected and assigned to the various source color occurrences. A step 18 selects the next source color occurrence having conflicting source color definitions and control returns to step 14, and the process repeats until all source colors identified in step 10 are reconciled.

Figure 2A:
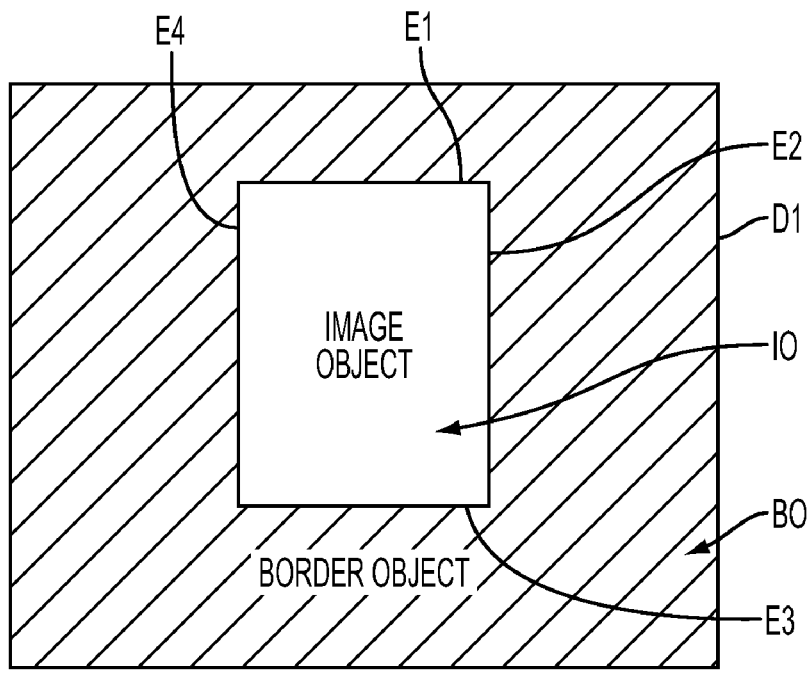
FIG. 2A illustrates one example of a composite electronic document including a raster image object (e.g., a digital photo) surrounded by a solid color border that is intentionally color mismatched with the raster image object to provide a contrasting background.
Figure 2B:
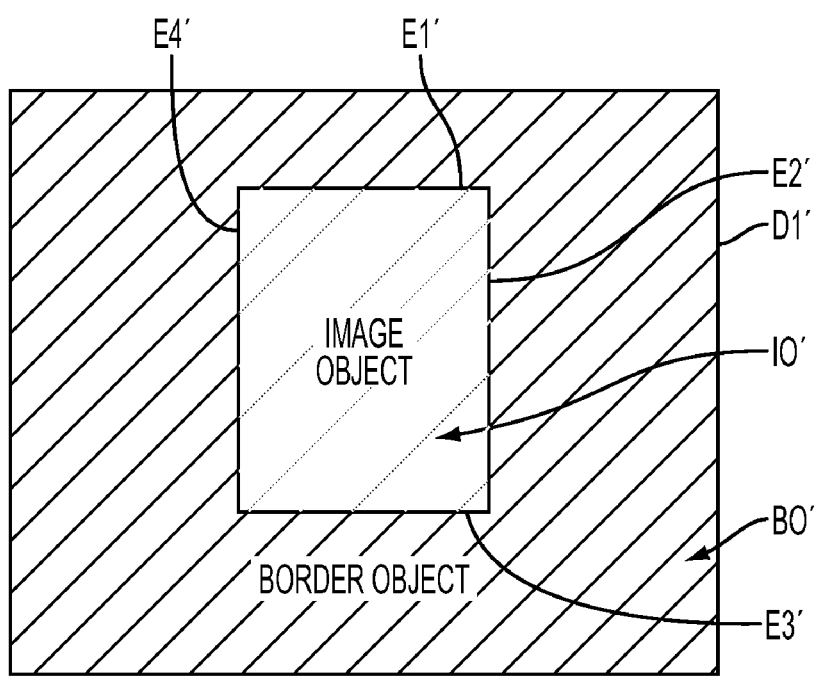
FIG. 2B illustrates another example of a composite electronic document wherein computer generated raster image object is surrounded by a solid color border that is color matched to the edges of the raster image object in order to provide a seamless color-matched background for the image object.

One particular color match situation arises when electronic documents such as those shown in FIGS. 2A and 2B are to be printed from a digital image file using a xerographic process, especially if the digital image file was originally intended for printing using a SWOP-based process. In FIG. 2A, an electronic document D1 comprises an image object IO defined as a raster image such as a bitmap or bytemap, e.g., a photograph derived from scanning or input from a digital photographic file or a computer-generated graphics image, surrounded (or bordered on at least one side) by a color graphics border object BO. In this case, the border object BO is not intended to be a color match with the edges E1,E2,E3,E4 of the image object IO and, instead, is intended to provide a contrasting background. FIG. 2B, on the other hand, shows an electronic document D1' comprising a raster image object IO', e.g., a photograph derived from scanning or input from a digital photographic file or a computer-generated graphics image, surrounded (or bordered on at least one side) by a color graphics border object BO' that is intended to color match the edges E1',E2',E3',E4' of the image object IO' so that a seamless color-matched background is provided by the border object BO'. It is understood that the terms bordering/surrounding are intended to refer to the visual appearance of the objects and that in a Page Description Language (PDL) these objects might take a different form, for example IO' might be described as being "on top" of BO'. In the case of the electronic document D1' of FIG. 2B, the color of the border object BO' will often not be printed in the same color as the edges E1'-E4' as intended because the image object IO' and the border object BO' are processed differently in the digital front end (DFE) of a xerographic printing apparatus, due to their different rendering intents associated with the different object types.

Figure 3:
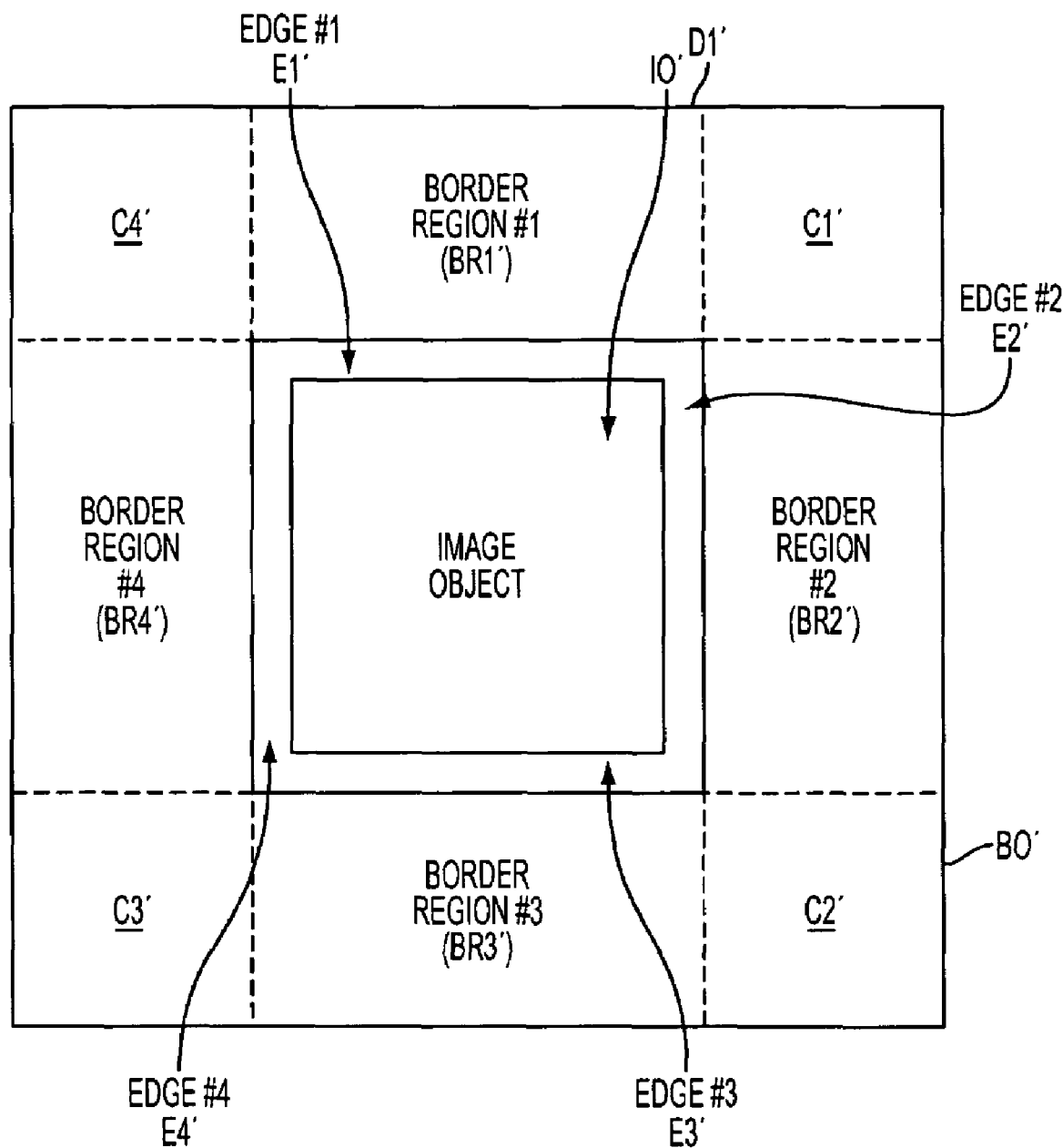
FIG. 3 diagrammatically illustrates the problem to be solved by the present development, wherein color match between one or more edge regions of a raster image object must be analyzed with respect to one or more respective border regions.

The electronic document D1' is shown in more detail in FIG. 3. There, it can be seen that the image object IO' comprises four edge regions E1'-E4' that are each defined by a select number (e.g. 15-20) rows (for edges E1',E3') or columns (for edges E2',E4') of pixel data as is known in the digital imaging arts. The border object BO' comprises four border regions BR1',BR2',BR3',BR4' that are located respectively adjacent and in abutment with the image edges E1'-E4'. The corner regions C1',C2',C3',C4' of the border object BO' are typically defined as part of one of the border regions BR1'-BR4', but are not relevant to the present discussion.

Figure 4:
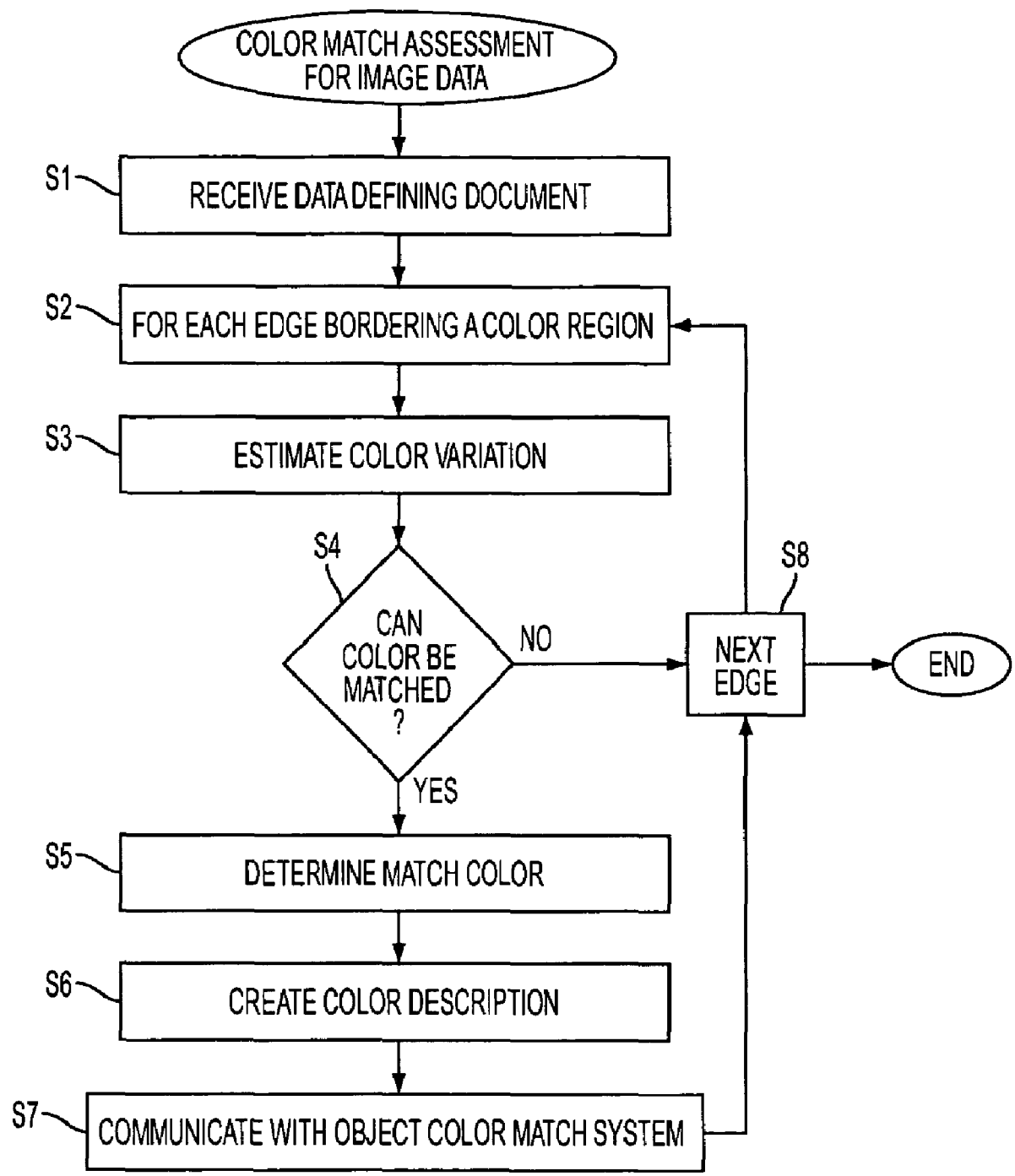
FIG. 4 is a flow chart that discloses color match assessment for image data in accordance with the present development.

FIG. 4 discloses a method of color match assessment for image data in order to process an electronic document such as the documents D1,D1' to ensure that objects that are intended to color match when printed are processed to preserve the intended color match through actual printing. A step S1 comprises receiving data defining an electronic document D1' to be printed, wherein the electronic document comprises at least one image object IO' defined as a raster image and at least one graphics object BO' defined to have a color region bordering the image object IO'. A step S2 successively processes each edge E1'-E4' of the image object IO' that borders the color region of the graphics object BO' according to steps S3-S8. The step S3 comprises estimating local color variations at the relevant edge of the image object to determine if the edge is relatively constant in color. The step S4 comprises determining if the color at the image edge being processed can be matched based upon the color variance input from step S3. If not, the process skips to step S8 to process the next edge of the image object. If the result of step S4 is that the color at the edge is suitably constant so that it can be matched, a step S5 determines the most likely match color for the edge. In one embodiment, this is the average color of the processed edge region. E1'-E4'. In another embodiment, the match color is more closely weighted to the row(s)/column(s) of the edge region E1'-E4' that are closest to the relevant border region BR1'-BR4' (farthest from the center of the raster image object IO') in order to account for the fact that the edges E1'-E4' of the raster image object IO' are graduated in color for blending purposes with the border region. In this case, the average is weighted toward to outermost rows/columns defining the edge E1'-E4'. A step S6 comprises creating an output color description of the match color determined in step S5 and associating the color description with the edge. An optional step S7 comprises communicating with the downstream object color match system/method of FIG. 1; alternatively, the color description of step S6 for each edge E1'-E4' is stored in association with the image data file for the electronic document D1' for later input to the object color match system of FIG. 1. A step S8 causes a repeat of steps S2-S7 for the next edge to be processed, until all relevant edges E1'-E4' of the image object IO' are processed.

Figure 5:
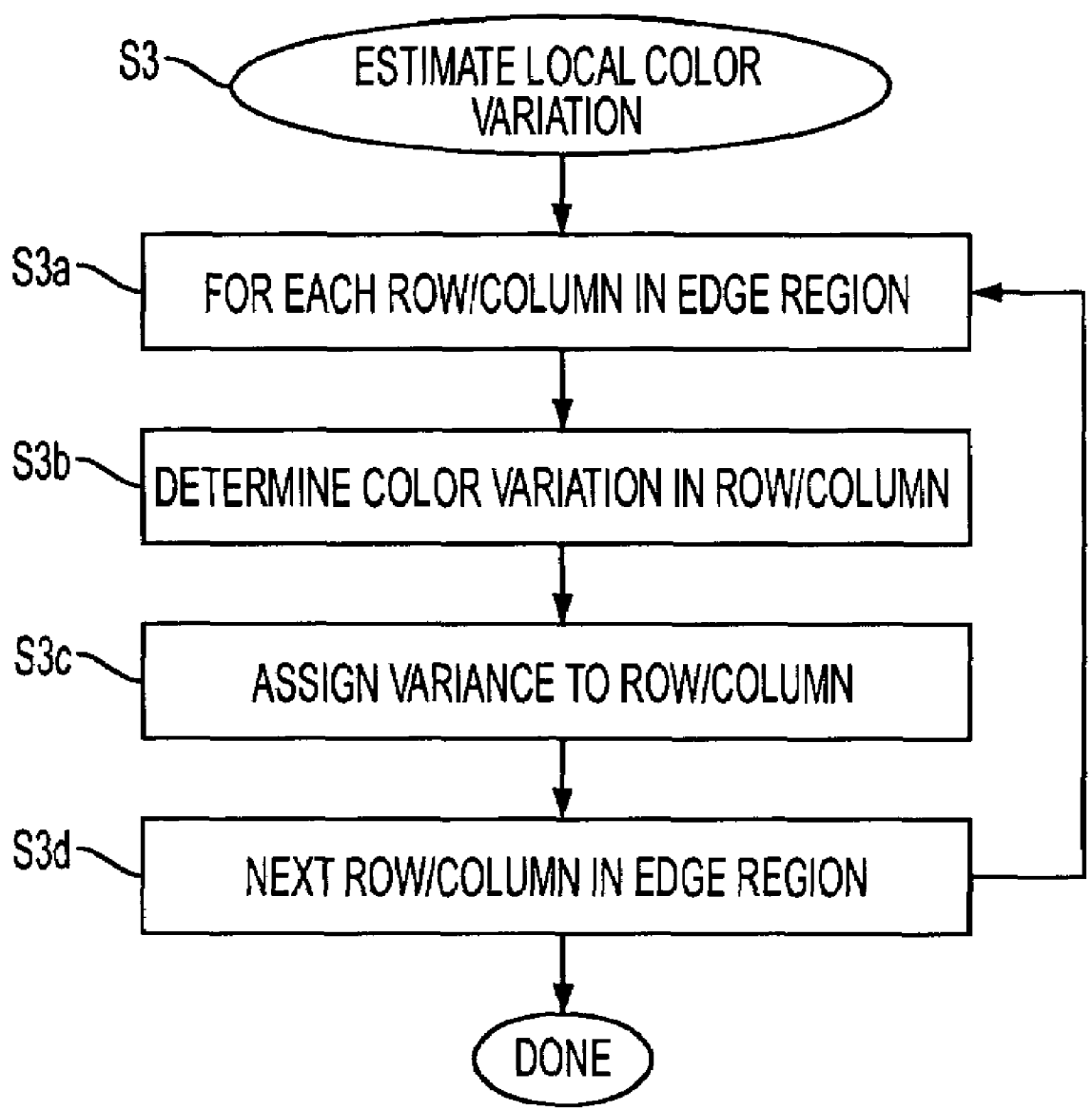
FIG. 5 is a flow chart that discloses an example of local color variation estimation as used in the color match assessment system system/method of FIG. 4.

Step S3 is disclosed in further detail with reference to FIG. 5. A step S3a processes all pixel color values of each row/column that defines the edge E1'-E4' (FIG. 3) being processed. The step S3b determines the variance among pixel color values in the row/column being processed, and the step S3c assigns a variance value to that row/column based on the results of step S3b. A step S3d begins the process again with step S3a for the next row/column to be processed, until all rows/columns of pixel color values for an edge E1'-E4' have been processed.

The variance calculation(s) used in S3b can be any suitable variance calculation, and a monotonic calculation is sufficient since relative measurements need not be used. In one example, the variance is calculated as:

$$V(y) = \Sigma |I(x,y) - \langle I(y) \rangle| \div N$$

where:

V(y) represents the color variance of the row/column of pixel values;

N represents the number of pixel values in the row/column being processed $\Sigma |I(x,y) - \langle I(y) \rangle|$ represents the sum of the absolutes, meaning the sum of the absolute values of the difference between $I(x,y) - \langle I(y) \rangle$ where I(x,y) is the pixel color value for a pixel being processed and $\langle I(y) \rangle$ is the mean of all color pixel values in the row/column being processed. Other variance and variance-like calculations can be used without departing from the overall scope and intent of the present development. Specifically, the variance calculation as outlined can be performed over a limited extent of the image edge to determine if that region could be subject to color match. Also, it is clear that an erroneous or noise "outlier" pixel color value can be encountered and such outliers be excluded from the variance calculation. These methods are well know in mathematics and are incorporated herein. For halftone images, a descreening step may be applied before the variation evaluation.

Only image sides that have a low variance number can be sides that might be color matched. In the description we assume, for simplicity, that an image side is homogeneous and a single variance number is sufficient. It is understood, however, that it is sufficient that a substantial part of an image side has a low variance to be a potential for color matching.

Figure 6:
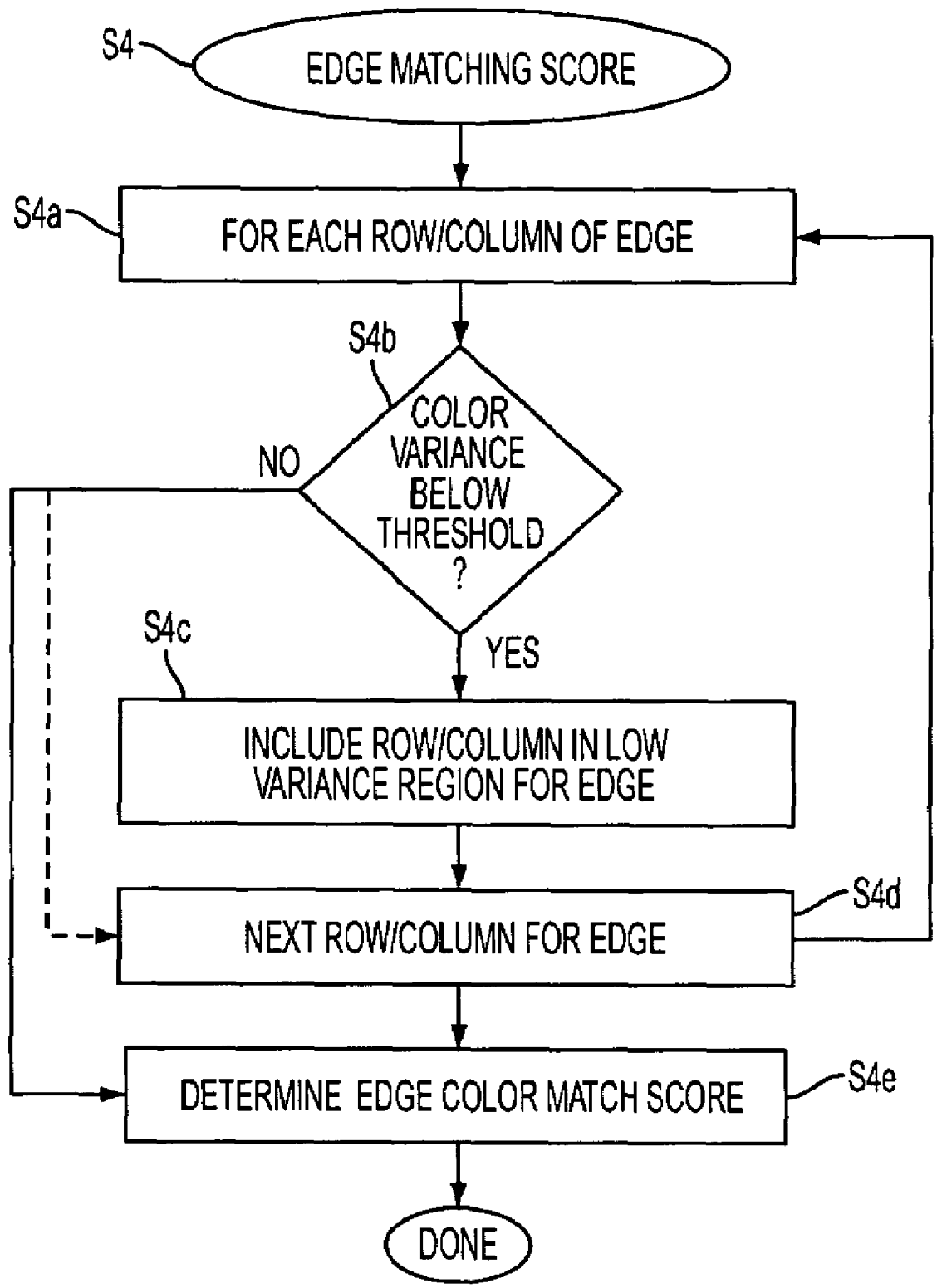
FIG. 6 is a flow chart that discloses an example of edge matching score as used as part of the color assessment system/method of FIG. 4.

The step S4, which determines if an edge of the image object can be color matched, is detailed in FIG. 6. A step S4a successively processes each row/column of an image edge E1'-E4' being considered. A step S4b determines if the color variance for the row/column is below a threshold. If not, meaning that the color of the row/column is too varied to be matched, the process preferably directly passes to S4e (as shown with a solid arrow) to set the probability of color matching the edge to zero so that the step S4 (FIG. 4) returns a "no" and so that the next edge can then be considered according to step S8 (FIG. 4). Optionally, as shown in a broken line in FIG. 6, if step S4b returns a "no" answer, control passes to step S4d to consider the next row/column of the edge beginning with the step S4a again. The reason that data that can not be matched does not necessarily cause the edge to be considered "non-matching" is the existence of noise inside the data. In the preferred embodiment, a "no" decision in step S4b leads to an immediate "no" output from step S4e and, thus from S4 as described above and as shown in solid lines in FIG. 6. In noisy situations it might direct processing to S4d, imposing appropriate noise limits as indicated with the broken line arrow.

If, however, step S4b determines that the color variance of the row/column is below the threshold, a step S4c is carried out to include the row/column in a "low variance" region for the edge E1'-E4', and the next row/column of that edge is processed in accordance with step S4a-S4d as just described. The threshold is preferably relaxed for rows/columns that are located closer to the center of the raster image object IO' and is more stringent for rows/columns located closer to the border regions BR1'-BR4', as it is more important that this outer rows/columns be close to constant color. Also, the initial threshold can be reset to a lower value (made more stringent) if the actual variance of a row/column is below the initial threshold. In some cases, it might be desirable to increase the threshold (relax the variance standard) when the size of the raster image object IO' increases.

When the step S4d has no more rows/columns to process for a given edge E1'-E4' of the image object IO', a step S4e determines the probability of matching a bordering color region of a graphics object to the edge. In general, the probability that an edge E1'-E4' can be color matched increases if the edge includes a larger size "low variance" region in terms of the number of rows/columns included therein. Also, the color match score is greater (indicating a greater likelihood of a desired color match) if the ending threshold is lower than the initial threshold, in the case where the threshold is decreased to the actual variance for a row/column when the actual variance is below the threshold. In such an embodiment, the step S4e can determine the matching score L of a color match according to: L=size of the low variance region*(initial ending threshold/actual threshold)$^2$ As such, if an initial threshold is set to 12, and is ultimately lowered to 8 based upon the actual variance values calculated for rows/columns of the edge, and if 8 rows/columns are included in the "low variance" region, the color matching score for the edge is: L=8*(12/8)$^2$=18.

In essence, the number calculated to indicate the color match score should monotonically increase with the number of edge rows/columns that fit the color matching criteria and it should also increase with lower variances. In the current exemplar equation, a simple linear factor was used to implement the size criterion and a quadratic relationship was used for the variance calculation. Using the initial variance as a normalization factor is for convenience only and can simply be modified.

Each edge E1'-E4' can be comprised of sub-component edge segments of constant, but different, color. In one alternative embodiment, the variance calculation for each edge E1'-E4' is locally adaptive to detect such segments. In this manner, if an edge E1'-E4' includes multiple different color match regions, these will be identified as discreet regions each having low color variance, even though the overall edge E1'-E4' has varying color due to the differing sub-component edge segments.

It should be understood that the use of a rectilinear image object was for convenience only, but that most image object will also exhibit such geometry. There is nothing in the description that would limit the present invention to such geometry, as long as an edge or a plurality of edges can be defined. This includes edges forming a trapezoid, the single edge delineating circles/ellipses, and the multiple edges delineating general shapes.

Those of ordinary skill in the art will recognize that the system/method of the present development as disclosed in FIGS. 4-6 aids the color match system/method of FIG. 1 in that the present development derives a match color for each edge E1'-E4'. This match color is input to the system/method of FIG. 1, along with the known color of the relevant border region(s) BR1'-BR4'. This, then, allows the object color match system/method of FIG. 1 to operate, in that the present development assigns a "match color" to the image edge(s) E1'-E4', if possible, for later matching as deemed necessary and appropriate according to the system/method of FIG. 1. Without the system/method of the present development, the object color match system/method of FIG. 1 is unable to know the color of a raster image object IO,IO' and, thus, cannot match same.

Figure 7:
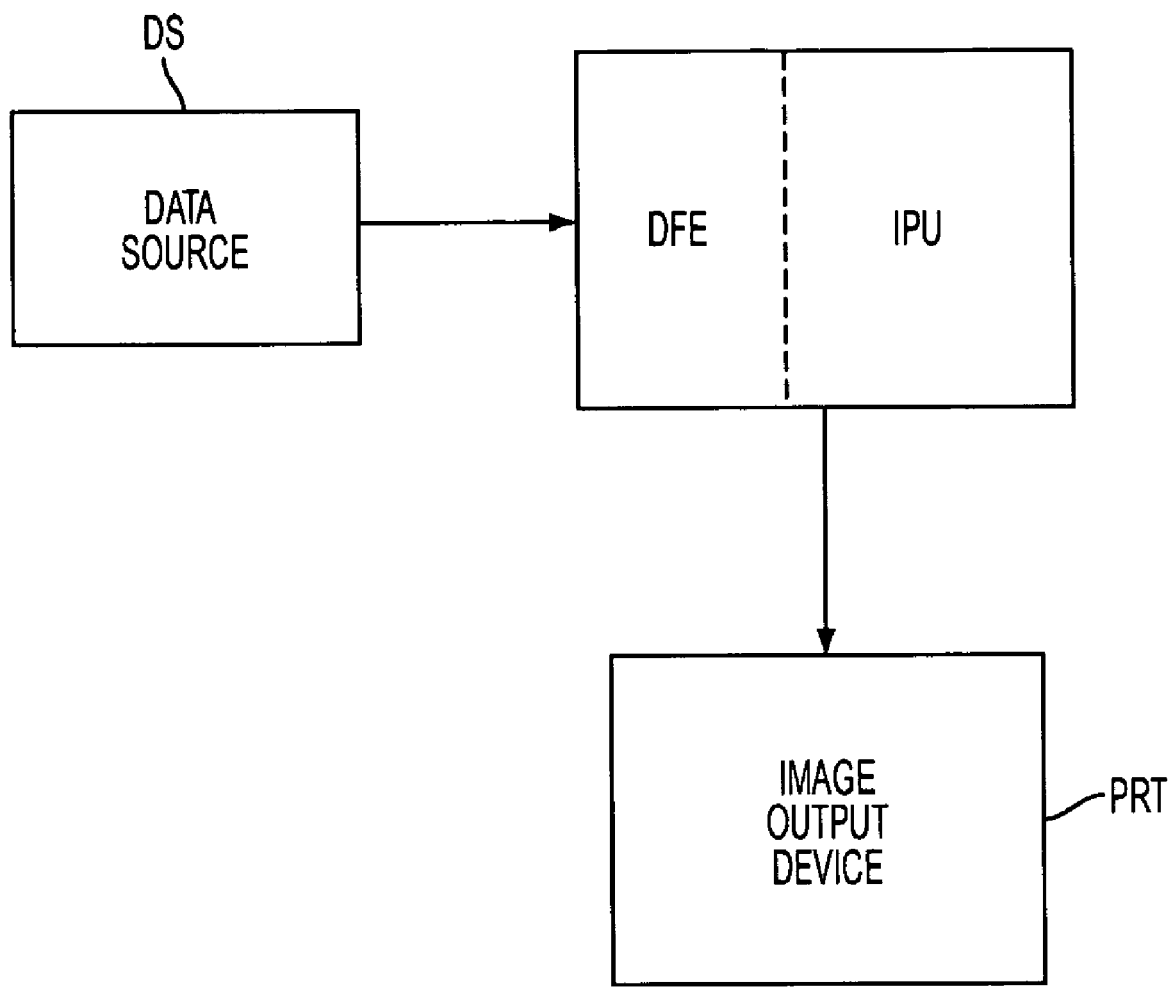
FIG. 7 diagrammatically illustrates an example of a xerographic printing apparatus 10 in which the system/method of the present development is implemented

FIG. 7 diagrammatically illustrates an example of a xerographic printing apparatus in which the system/method of the present development is implemented. The device comprises a data source DS for storing and/or inputting the digital data defining the electronic document to be processed. The data source comprises one or more input devices such as optical/magnetic media, random access memory, a computer workstation, etc. The data source is connected to an image processing unit IPU comprising a digital front end (DFE). The image processing unit comprises a combination of hardware and software that perform digital image processing operations in accordance with the present development. The image processing unit is connected to a image output device PRT comprising a print engine for depositing ink or toner on paper or another recording media in response to the output of the image processing unit. Typically, the image output device is a CMYK printer device as is known in the art.

While particular embodiments have been described, alternatives, modifications, variations, improvements, and substantial equivalents that are or may be presently unforeseen may arise to applicants or others skilled in the art. Accordingly, the claims as filed and as they may be amended are intended to embrace all such alternatives, modifications variations, improvements, and substantial equivalents.

The invention claimed is:

1. A method of color match assessment for electronic documents, said method comprising:
   (a) receiving into an image processing unit of a xerographic printing apparatus digital data defining a composite electronic document including both a raster image object having an edge and a color graphics object bordering said edge of said raster image object;
   (b) processing pixel color values defining said edge of said raster image object to estimate a local color variance of said pixel color values defining said edge, wherein the edge is defined by multiple rows/columns of said pixel color values, and wherein said step of processing pixel color values defining said edge comprises:
   calculating a row/column local color variance for each row/column of said pixel color values defining said edge;
   comparing said row/column local color variance for each row/column to said threshold;
   including said row/column in a low variance region for said edge if said row/column local color variance is below said threshold;
   increasing a color matching score that said edge can be color matched based upon an increasing number of rows/columns included in said low variance region for said edge;
   (c) determining said edge can be color matched based upon a magnitude of the color matching score, wherein a higher color matching score indicates a greater likelihood that said edge can be color matched;
   (d) if said edge can be color matched, deriving a match color for said edge, and associating said match color with said electronic document for use of said match color by a downstream object color match system of said image processing unit;
   (e) using said xerographic printing apparatus to print said composite electronic document on paper using ink or toner, wherein part of said composite electronic document is printed using said match color.

2. The method of color match assessment for electronic documents as set forth in claim 1, wherein:
   said raster image object comprises multiple edges and wherein said electronic document comprises multiple color graphics objects respectively bordering said multiple edges; and,
   for each one of said multiple edges, in order to derive a match color to be associated with each one of said multiple edges, respectively, said method comprises:
   processing pixel color values defining each edge of said raster image object to estimate a respective local color variance of said pixel color values defining each edge;
   for each edge, determining the edge can be color matched only if said local color variance of the edge is below a threshold;
   for each edge that can be color matched, deriving a respective match color for the edge.

3. The method of color match assessment for electronic documents as set forth in claim 1, wherein said match color is derived as an average of all pixel color values defining said edge.

4. The method of color match assessment for electronic documents as set forth in claim 1, wherein said match color is derived as a weighted average of all pixel color values defining said edge.

5. The method of color match assessment for electronic documents as set forth in claim 4, wherein pixels color values defining said edge and located farther from a center of said raster image object are weighted more in said weighted average as compared to pixel color values defining said edge and located closer to said center of said raster image object.

6. The method of color match assessment for electronic documents as set forth in claim 1, wherein said local color variance of said pixel color values defining said edge is determined as:

$$V(y) = \Sigma |I(x,y) - \langle I(y) \rangle| \div N$$

where:
   $V(y)$ represents the color variance of the row/column of pixel values;
   $N$ represents the number of pixel values in the row/column being processed;
   $\Sigma |I(x,y) - \langle I(y) \rangle|$ represents the sum of the absolutes, meaning the sum of the absolute values of the difference between $I(x,y) - \langle I(y) \rangle$ where $I(x,y)$ is the pixel color value for a pixel being processed and $\langle I(y) \rangle$ is the mean of all color pixel values in the row/column being processed.

7. The method of color match assessment for electronic documents as set forth in claim 1, wherein said threshold is set to an actual variance calculated for a row/column when said actual variance is below said threshold.

8. The method of color match assessment for electronic documents as set forth in claim 1, wherein said threshold varies depending upon a location of each row/column of pixel color values defining said edge, wherein said threshold is lower for rows/columns farther from a center of said raster image object.

9. A method of color match assessment for electronic documents, said method comprising:
   (a) receiving into an image processing unit of a xerographic printing apparatus digital data defining a composite electronic document including a raster image object having an edge and a color graphics object bordering said edge of said raster image object;

(b) processing pixel color values defining said edge of said raster image object to estimate a local color variance of said pixel color values defining said edge;

(c) using said local color variance to determine if said edge can be color matched;

(d) if said edge can be color matched, deriving a match color for said edge, and associating said match color with said electronic document for use of said match color by a downstream object color match system of said image processing unit;

(e) using said xerographic printing apparatus to print said composite electronic document on paper using ink or toner, wherein part of said composite electronic document is printed using said match color;

wherein said local color variance of said pixel color values defining said edge is determined as:

$$V(y) = \Sigma |I(x,y) - \langle I(y) \rangle | \div N$$

where:

$V(y)$ represents the color variance of the row/column of pixel values;

N represents the number of pixel values in the row/column being processed;

$\Sigma |I(x,y) - \langle I(y) \rangle|$ represents the sum of the absolutes, meaning the sum of the absolute values of the difference between $I(x,y) - \langle I(y) \rangle$ where $I(x,y)$ is the pixel color value for a pixel being processed and $\langle I(y) \rangle$ is the mean of all color pixel values in the row/column being processed.

* * * * *